United States Patent [19]
Jakubovicz

[11] 3,742,115
[45] June 26, 1973

[54] MUSICAL INSTRUMENT AND ASSOCIATED METHOD

[76] Inventor: Jose Jakubovicz, Praia do Flamengo 386, Rio, Brazil

[22] Filed: Nov. 17, 1971

[21] Appl. No.: 199,485

Related U.S. Application Data

[63] Continuation-in-part of Ser. No. 841,339, July 14, 1969, Pat. No. 3,641,864.

[52] U.S. Cl. .................................... 84/470, 84/479
[51] Int. Cl. ........................................... G09b 15/02
[58] Field of Search ................. 84/403, 470; 84/479

[56] References Cited
UNITED STATES PATENTS

| | | | |
|---|---|---|---|
| 3,641,864 | 2/1972 | Jakubovicz | 84/470 |
| 636,232 | 11/1899 | Anderson | 84/470 |
| 1,392,766 | 10/1921 | Huth | 84/470 |
| 3,483,786 | 12/1969 | Heninger et al. | 84/470 |

Primary Examiner—Richard B. Wilkinson
Assistant Examiner—Lawrence R. Franklin
Attorney—Eric H. Waters et al.

[57] ABSTRACT

A musical instrument comprises sonorous bars mounted in sequence of pitch in a hollow, open box. A frame carrying a flexible band of material is mountable on the box in the opening thereof so as to be superimposed on the bars. A musical staff and notes are printed on the band and the notes correspond to the arrangement of the bars. The frame is fitted in the box to provide a singular position of the band in which the notes thereon are aligned with the respective bars therebeneath. By striking each note with a hammer the bar therebeneath is sounded to provide immediate association of the note and its corresponding sound.

8 Claims, 3 Drawing Figures

MUSICAL INSTRUMENT AND ASSOCIATED METHOD

This application is a continuation-in-part application of my earlier application Ser. No. 841,339 filed July 14, 1969 now U.S. Pat. No. 3,641,864, the contents of said earlier application being incorporated by reference herein.

BRIEF SUMMARY OF THE INVENTION

The invention relates to a musical instrument and particularly to an instrument which can be utilized in teaching the reading of music. The invention also relates to a method associated with the use of the instrument.

An object of the invention is to provide a method and an instrument which will have utility in teaching the reading of music by providing the capability of simultaneously viewing musical notes on a staff and producing corresponding sounds. Thereby, there is immediate knowledge of the musical notes in the staff with the corresponding sounds.

The invention contemplates the juxtaposition of sonorous bars and a flexible band with a musical staff and notes. The notes are indicated in the staff in a given clef, each musical note in the staff corresponding to a respective bar and being placed opposite such bar; when a musical note is struck by a hammer or the like, the sound corresponding to the musical note indicated on the staff is produced by a striking of the bar adjacent the note.

Thus, by striking the musical notes on the band, corresponging sounds are produced by the vibration of the bars, since each bar corresponds to the sound of the note indicated on the staff.

The invention further contemplates a means to position the band in a singular position in which the notes on the staff are aligned with the respective bars.

According to the invention, this is achieved by supporting the band on a frame which is mountable in such singular position.

DETAILED DESCRIPTION

Figure 1:
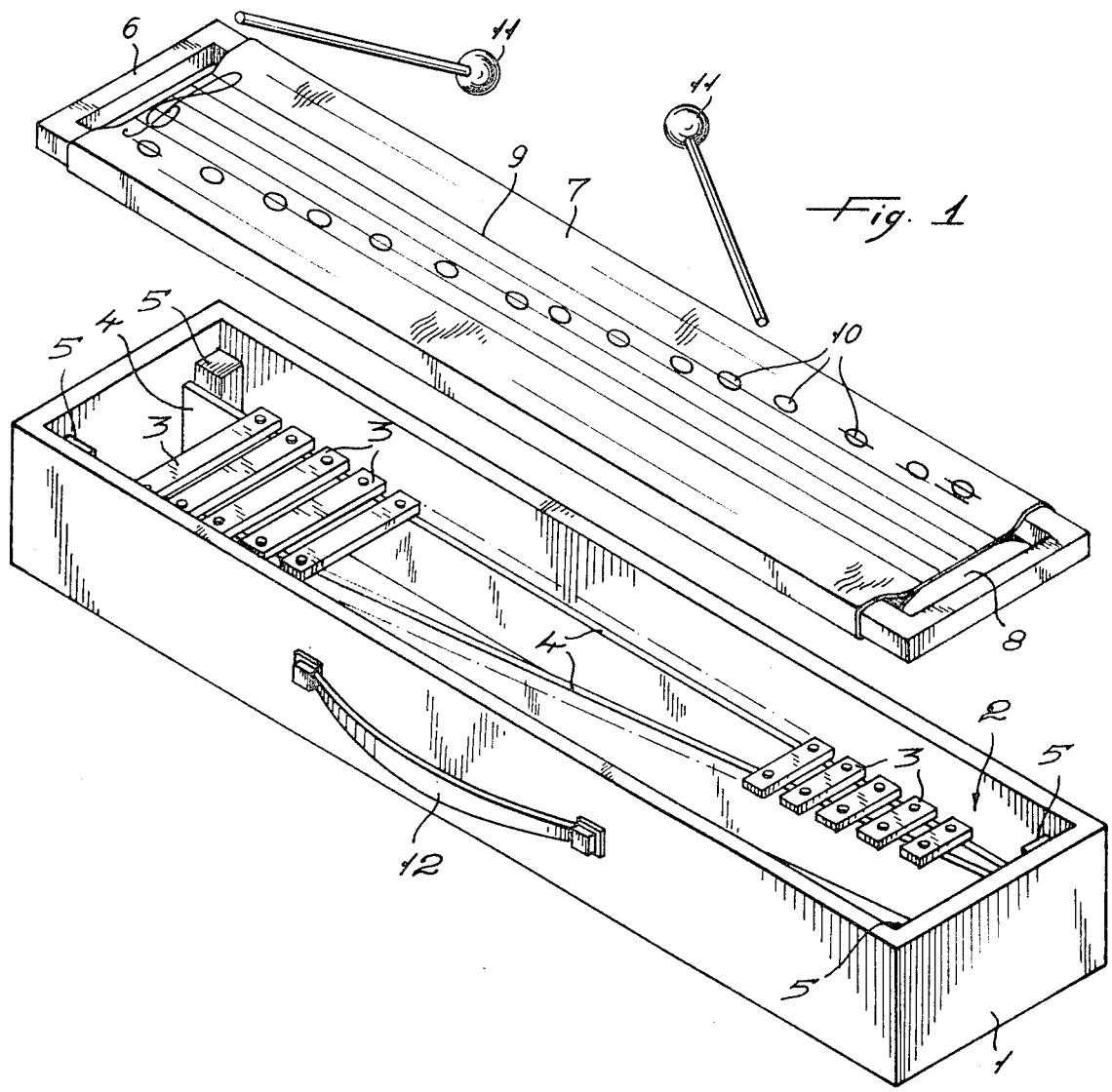
FIG. 1 is an exploded perspective view of an instrument according to my invention.

Referring to the drawing, therein is seen a hollow box 1 with an open top 2, and within the box are mounted a number of sonorous bars 3 on plates 4 which extend along the length of the box. The sonorous bars may be made of metal or the like and they are arranged in sequence of pitch of sounds i.e., frequency. The bars are secured to the plates by conventional means (not shown) such as pins and felt washers whereby when each bar is struck, a particular frequency of sound is produced by vibration of the bar. By the term "sonorous bar" is meant any elongated element capable of producing a sound of a particular frequency when struck, such as a string or the like.

The bars are mounted below the level of the open top of the box 1. The box 1 is rectangular and at each of the four corners thereof are posts 5 adapted to support a frame 6 to which is attached a flexible band 7. The band extends transversely across the entire width of the frame and defines openings 8 at the sides of the frame for a purpose to be described later. The top of posts 5 are slightly below the level of the upper edge of box 1 so that the frame and band lie flush with the upper edge of the box when deposited on the posts 5 as seen in FIG. 2.

The band 7 may be made of plastic, paper, cloth or the like and on the band is placed (by printing or the like) a musical staff 9 with musical notes 10. The band is shown in FIG. 1 with the staff in the G clef on the second line and the notes on the staff are arranged in correspondence with the bars. The staff may be in a different clef and indeed it is contemplated that a plurality of different bands with different clefs can be mounted on the box, as desired, for purposes of teaching the scales in the different clefs. In my prior Application, I have shown the use of various clefs and scales for use in the instrument and reference can be made thereto for such information.

Figure 2:
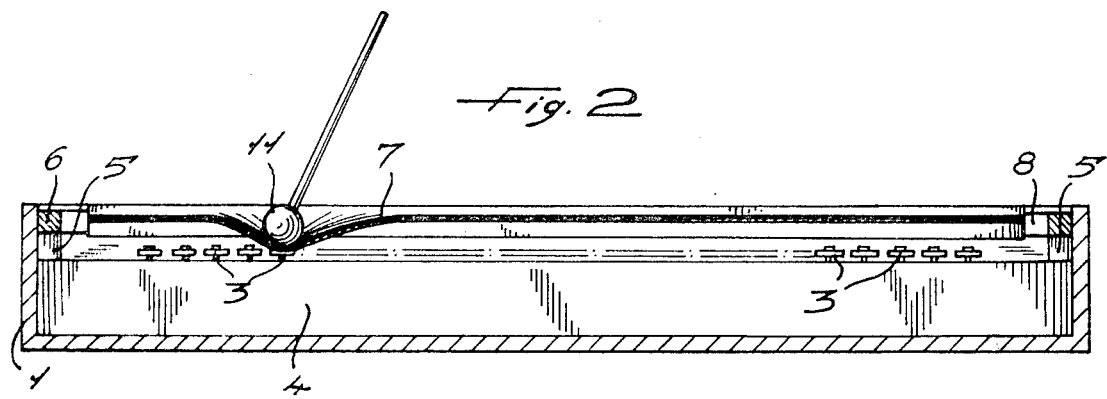
FIG. 2 is a side elevational view in section showing one of the notes of the band being struck.

As seen in FIG. 2, the frame 6 is rested on the posts 5 and the band 7 is superimposed above the bars. The frame 6 is rectangular and fits within the box 1 such that the corners of the box establish a singular position for the frame on the posts. In this position, each note on the band is superimposed in alignment with a corresponding bar 3 therebeneath.

The band is continuous at the notes, i.e., substantially non-apertured thereat such that if the band is struck at the notes by hammers or beaters 11 as shown in FIG. 2, the band will deflect and permit the bar therebeneath to be sounded by the percussion of the hammer. Thereby, there is association between the printed note and the sound thereof. This is valuable in learning to read music and immediately conveys to the student and the instructor the sound of the particular note which is struck. Thus the instructor can request the student to play a particular note and determine by the sound whether the correct note has been struck. The presence of the openings 8 between the band 7 and frame 6 enables the emission of sound from the box.

As explained in my earlier Application, the bars can be arranged in chromatic scale or diatonic scale and the musical staffs may be in any selected clef with the notes arranged in correspondence with all or selected of the bars.

The different bands with the different clefs are rapidly mounted on the box and removed therefrom, and each mounting automatically produces immediate registry of the notes on the band with the sonorous bars due to the fitting of the corners of the frame with the corners of the box. Of course, the box and frame need not be rectangular but could assume other shapes, and the registry of the frame on the box may be achieved by other suitable means such as interfitting pins and holes or the like.

The band is not tautly mounted on its frame and it has a sufficient looseness and yieldability so that when struck by the hammer, it will deflect and enable the hammer to strike the bar therebeneath and produce a clean sound, whereas after the hammer is removed, the band will assume its original position. As a preferred material, the band is constituted of a plastic material such as polyethylene, polyvinyl chloride, etc. The frame 6 is preferably of wood, and may be rectangular or circular in section.

In order for the band to deflect when struck and enable the underlying bars to be sounded, the band must have continuity both in the length and width. Thus, although the band may have apertures (not shown) for decorative purposes or the like, it must not be discontinuous in a way which would interfere with its deflection when struck and its subsequent return to original position. The continuity of the band is also essential to permit the staff to be continuously indicated therein, and permit the notes to be placed on the lines of the staff or in the spaces between the lines of the staff or on lines or spaces outside the staff, as is conventional. In this respect, it is essential that the student be able to learn the notes on the staffs in conventional musical nomenclature without resort to any auxiliary devices or artificial designations. The band completely covers the array of bars therebeneath to permit this to be achieved.

The box 1, posts 5 and plates 4 are also preferably made of wood. A cover (not shown) may be hinged to the box 1 to close the box when the instrument is not in use. Additionally, a handle 12 can be attached to the box to permit the box to be easily carried.

Figure 3:
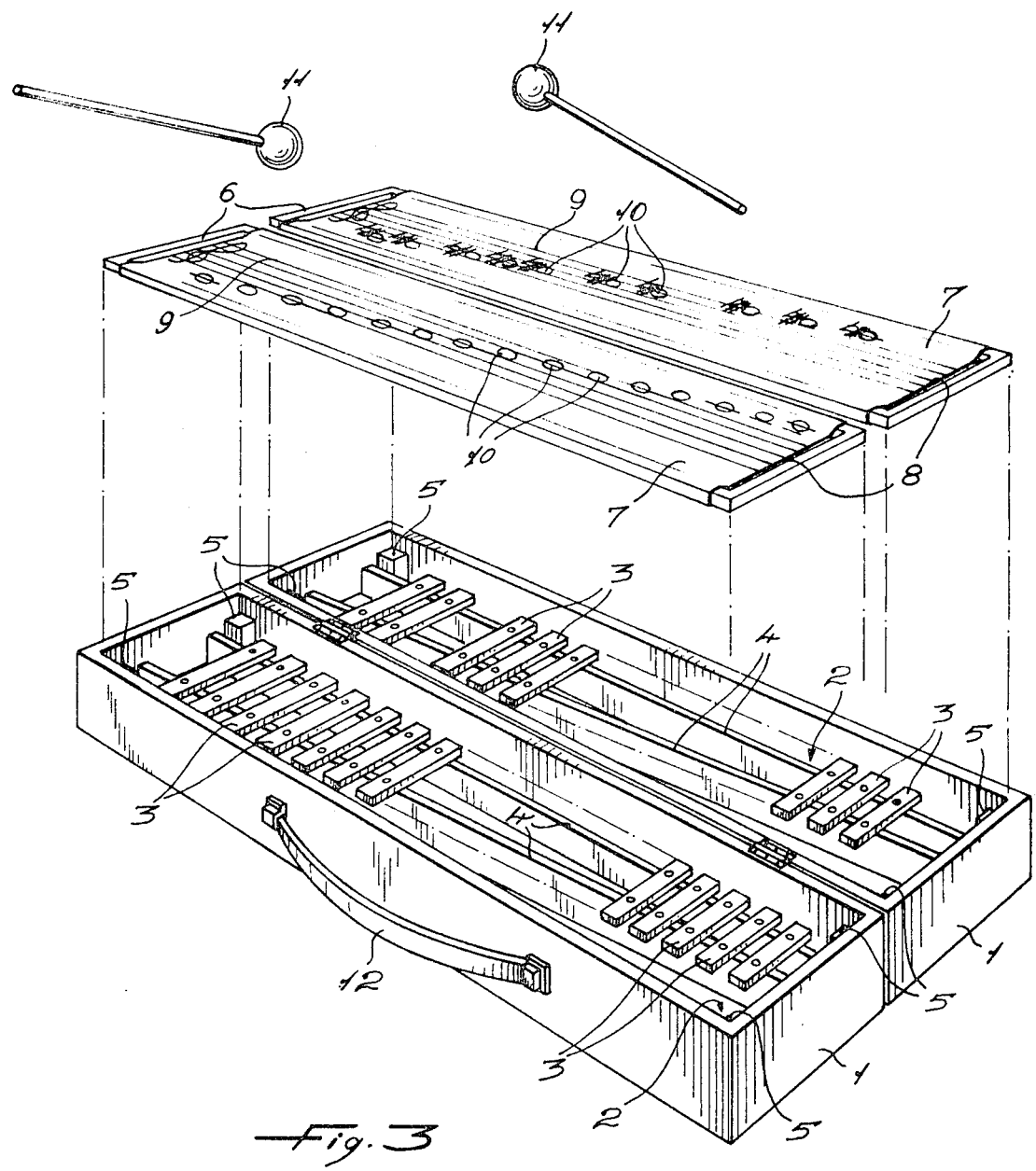
FIG. 3 is an exploded perspective view of another embodiment of an instrument according to my invention.

Another embodiment of the invention is illustrated in FIG. 3 and herein the same numerals are used to designate the same structure ss in the embodiment in FIG. 1.

In FIG. 3 a second box 1 is provided and the sonorous bars 3 are arranged in two different arrays in the respective boxes. In one box are arranged the natural notes of the diatonic scale in sequence of pitch of sounds with equal spacing between the bars whereas in the other box there are arranged sonorous bars of the altered notes (sharps and flats).

One of the flexible bands is provided with the musical staff with the natural notes of the diatonic scale indicated in the staff in a given clef and the other flexible band is provided with the musical staff with the altered notes indicated in the staff in a given clef.

The bands are placed opposite the bars in the same way as already described and the operation of this embodiment is similar to the description as before mentioned and seen in FIG. 2.

In the embodiment of FIG. 3 the two boxes 1 are hinged together and when the instrument is not in use, the two boxes are closed.

Although numerous variations and modifications of the disclosed invention will now become apparent to those skilled in the art, these will not depart from the scope and spirit of the invention if defined by the appended claims.

What is claimed is:

1. A musical instrument comprising sonorous bars arranged in juxtaposed relation, a flexible band of material with a musical staff and musical notes indicated on the staff, said notes corresponding to the arrangement of said bars, said band being substantially non-apertured at said notes, a frame supporting said band, means supporting said frame such that said band is above said bars, means positioning said frame so that the notes on the staff are aligned with respective bars therebeneath, and percussion means for striking the band at the musical notes on the staff to strike the bars therebeneath and produce for each note a sound from the associated bar.

2. An instrument as claimed in claim 1 wherein said frame and band define an opening for emission of sound.

3. An instrument as claimed in claim 2 comprising an open box, said bars being mounted in said box, said frame being mountable on said box to cover the bars.

4. An instrument as claimed in claim 3 wherein said means supporting said frame comprises supports in said box on which said frame can rest.

5. An instrument as claimed in claim 4 wherein said means which positions said frame comprises means in said box for engaging the frame to establish a singular position in which the frame can rest on said supports.

6. An instrument as claimed in claim 5 wherein said frame has a corner and said box has a corresponding corner serving as the means to establish said singular position.

7. An instrument as claimed in claim 6 wherein said frame and box are rectangular.

8. An instrument as claimed in claim 1 wherein said bars are disposed in two separate arrangements in sequence of pitch, one in juxtaposed relation with a respective flexible band with the musical staff with the natural notes of the diatonic scale indicated in the staff and the other with a respective flexible band with the musical staff with the altered notes indicated in the staff, said notes corresponding to the arrangements of said bars, said bars of the natural notes of the diatonic scale having equal spacing therebetween.

* * * * *

UNITED STATES PATENT OFFICE
CERTIFICATE OF CORRECTION

Patent No. 3,742,115      Dated June 26, 1973

Inventor(s) Jose Jakubovicz

It is certified that error appears in the above-identified patent and that said Letters Patent are hereby corrected as shown below:

On the cover sheet insert -- The portion of the term of this patent subsequent to Feb. 15, 1989, has been disclaimed.

Signed and sealed this 21st day of January 1975.

(SEAL)
Attest:

McCOY M. GIBSON JR.
Attesting Officer

C. MARSHALL DANN
Commissioner of Patents